United States Patent

[11] 3,562,430

[72] Inventors Claude M. Faust;
Albert H. Campbell, Portland; Harold R. Burt, Beaverton, Oreg.

[21] Appl. No. 777,972
[22] Filed Oct. 30, 1968
[45] Patented Feb. 9, 1971
[73] Assignee Ford Industries, Inc.
Portland, Oreg.
a corporation of Washington
Continuation of application Ser. No. 534,152, Mar. 14, 1966, now abandoned. This application Oct. 30, 1968, Ser. No. 777,972

[54] TELEPHONE ANSWERING DEVICE
8 Claims, 6 Drawing Figs.

[52] U.S. Cl. .......... 179/1
[51] Int. Cl. .......... H04m 1/00
[50] Field of Search .......... 179/1C, 6, 5.5; 267/(Inquired)

[56] References Cited

UNITED STATES PATENTS

| | | | |
|---|---|---|---|
| 3,471,643 | 10/1969 | Owen | 179/1(C) |
| 3,319,003 | 5/1967 | Prager | 179/1(C) |
| 2,165,546 | 7/1939 | Heller | 179/6 |

*Primary Examiner*—Kathleen H. Claffy
*Assistant Examiner*—Charles W. Jirauch
*Attorney*—Kolisch & Hartwell

ABSTRACT: A telephone answering device adapted to be seated on and supported by the base of a telephone and to cradle the telephone's handset. The device includes apparatus for communicating with the transmitting and receiving transducers in the telephone's handset, and adjusting means for adjusting the position of the telephone's switch buttons in response to the presence or absence of a handset cradled in the device and to the occurrence of an incoming telephone call.

Claude M. Faust
H. Albert Campbell, Jr.
Harold R. Burt
INVENTORS
BY Kolisch & Hartwell
Attys.

Claude M. Faust
H Albert Campbell, Jr.
Harold R. Burt
INVENTORS
BY Kolisch & Hartwell
Attys.

TELEPHONE ANSWERING DEVICE

This application is a continuation of our prior filed copending U.S. application, Ser. No. 534,152, filed Mar. 14, 1966,entitled "Telephone Answering Device," now abandoned.

This invention pertains to a telephone answering device whereby an unattended telephone, on receiving an incoming call, may be connected for communication with recording apparatus and the like. More particularly, it relates to compact answering device of the type mentioned which seats conveniently on the base of an ordinary telephone in place of the handset, and which is adapted to receive and hold the handset of the telephone in a position where the transmitting and receiving transducers therein communicate through the device with recording apparatus to which the device is connected.

Known telephone answering devices are characterized by various disadvantages. With some, the whole telephone must be moved and placed on the device in a special position in order for the device to operate properly. In others, the handset must be lifted from the base of the telephone and placed separately in an answering device which is remote from the base. In still others, the answering device, to be operable, must first be conductively connected to the telephone line leading to the telephone. In nearly all known types, when the answering device is connected for use, it interferes in some way with normal use of the telephone.

A general object of the present invention, therefore, is to provide a novel telephone answering device which is simple and convenient to use with a telephone, and which in operative position, causes minimal interference with the normal use of a telephone.

Another object is to provide such a device which may readily be installed for use without modification of the telephone.

A further object is to provide an answering device of the type described which is versatile in the sense that it may easily and quickly be shifted for use from one telephone to another when desired.

Thus, the invention contemplates an answering device which comprises a compact unit, including communication means, adapted to seat on the base of an ordinary telephone and including cradling structure for freely holding the telephone's handset in a position where the communication means in the device may readily communicate with the transmitting and receiving transducers in the handset. The invention further features a construction where no conductive connection is required between the device and the telephone line which is connected to the telephone.

Considering other factors which ought to be taken into account for an answering device to obtain good versatility, different telephones throughout the country have different structural characteristics. Further explaining, handsets in different telephones may vary quite widely in weight, and the means provided for biasing the cradleswitches in different telephones may differ markedly in the biasing forces which they exert on such switches. As a consequence, where an answering device depends upon the weight of a handset to depress such cradleswitches, it is important that the device offer a construction which fully utilizes the handset's weight to accomplish this. Further, since the mechanism in an answering device for depressing cradleswitches is normally disposed directly thereover with the device inoperative position, it is important that the biasing means for the cradleswitches not be relied upon to produce a sufficient force to raise both them and such overlying mechanism. This is particularly important where an answering device is to be employed with a telephone having relatively weak biasing means for its cradleswitches.

To take care of such mechanical differences in various telephones, the invention contemplates a novel mechanism which is responsive to the presence or absence of a handset in the device's cradling structure to adjust the positions of the cradleswitches in a telephone. More specifically, the proposed mechanism includes an actuator bar adapted to be shifted downwardly to depress a telephone's cradleswitches with a handset received in the cradling structure, and a pair of lifting springs exerting an upward pull on the actuator bar serving to lift the bar away from the cradleswitches on the handset being removed from the cradling structure. Such lifting springs ensure that the biasing means provided for the cradleswitches is not relied upon to lift the actuator bar and any structure which may be supported on top of the bar. As a result, applicants' answering device can readily be used with many different telephones, regardless of differences in the biasing means acting on the telephones' cradleswitches.

The mechanism just mentioned for adjusting the cradleswitches' positions further comprises a novel handset support which includes a planar deck portion that extends substantially completely across the width of the device in a position to be engaged by a handset received in the cradling structure. A pair of springs supporting opposite sides of the deck in the handset support act between the deck and the actuator bar. With such construction, a relatively large support surface is provided whereby a handset received in the cradling structure is fully supported by the deck in the support. As a result, the full weight of a handset may be utilized through the mechanism to depress the telephone's cradleswitches.

Still another object of the invention is to provide an answering device as outlined which permits relatively normal use of a telephone with the device remaining seated in operative position on the telephone base.

A further object is to provide in such a device means for simulating answering of a telephone whereby, with the device in operative position on the telephone base, and the handset held in the device in a position where its transmitting and receiving transducers may communicate with the communication means in the device, the telephone is placed in an answered condition on receiving a call, with the handset continuing to be held in the device in the same position which it had prior to the call being received.

These and other objects and advantages attained by the invention will become more fully apparent as the description which follows is read in conjunction with the accompanying drawings, wherein.

Figures 1, 5:
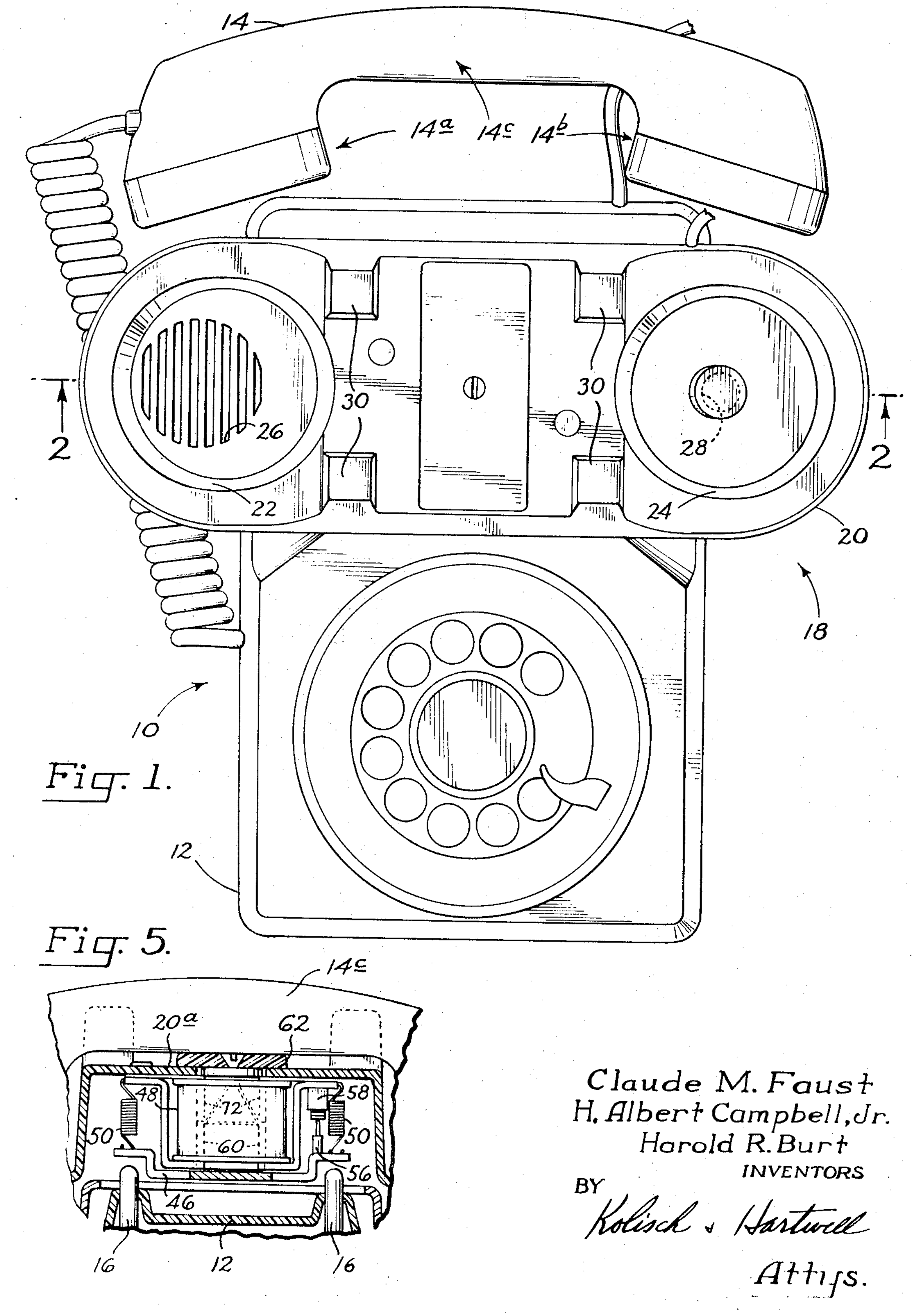
FIG. 1 is a plan view of a telephone, on the base of which is seated an answering device as contemplated herein, with the handset of the telephone removed from the base and placed to the rear thereof.
FIG. 5 is a view similar to portions of FIG. 4 illustrating parts of the answering device in yet another set of positions that they occupy with the telephone handset resting on the device.

Turning now to the drawings, and referring first to FIGS. 1-—3, at 10 is a conventional telephone having a base 12 and a handset 14. The handset includes the usual transmitting and receiving transducers indicated generally at **14*a*,14*b*respectively, and a handle 14*c*.Referring for a moment, particularly to FIG. 2, protruding through the top of the base adjacent opposite sides thereof are a spring-biased cradleswitches 16 which operate in a well-known manner to place the telephone in a condition where it may transmit and receive signals over the telephone line to which it is connected. These cradleswitches, referred to collectively herein as cradleswitch means, are biased to one position (illustrated in FIG. 2) where they project upwardly from the top of the base and they have another position (shown in FIG. 4**) where they are retracted into the base.

This invention contemplates a telephone answering device 18 which, in operative position, is seated on top of base 12 in place of handset 14. The answering device comprises a somewhat dumbell-shaped housing 20, having upper and lower housing sections 20*a*,20*b*respectively, which may be molded from a suitable plastic material have the shapes indicated. The housing sections are fitted together as shown in the drawing, and secured to another in any suitable manner.

Upper section 20*a*is formed in such a fashion that it will freely receive and hold handset 14 of the telephone. Thus, the upper housing section includes, adjacent its opposite ends, upwardly facing, open-topped recesses or wells 22, 24 which are adapted to receive the transmitting and receiving transducers, respectively, in the handset. The base of well 22 contains multiple slot openings 26 (best illustrated in FIG. 1) and the base of well 24 contains a central, substantially circular opening 28. In its medial portion, between the two wells, the upper housing section includes two pairs of spaced apart upwardly projecting posts 30, which, together with the two wells described, constitute cradling means herein for receiving and holding the telephone handset.

Lower housing section 20*b*has a shape which is somewhat similar to that of upper housing section 20*a*.Thus, the lower housing section includes upwardly facing recesses or wells 32, 34 adjacent its opposite ends. Between these wells, the lower housing section has an opening 36 (see FIG. 2). With the two housing sections fastened together as illustrated in FIG. 2, wells 32, 34 directly underlie wells 22, 24, respectively, in the upper housing section.

According to the invention, the answering device further comprises communication means for communicating with the transmitting and receiving transducers in handset 14. In the embodiment shown, the communication means comprises a loudspeaker 38 and a coil 40. Loudspeaker 38 is suitably fastened to the upper housing section beneath the base of well 22 in a position facing upwardly toward slot openings 26. Coil 40 is mounted on the upper housing section adjacent the base of well 24, with a portion of the coil extending as shown through opening 28. Coil 40 is suitably electrically connected to a circuit illustrated by a dashed block 42 in FIG. 2 which is referred to herein as a receiving circuit. The electrical components of receiving circuit 42, which will be described in detail later, are suitably mounted in well 34 of the lower housing section.

Mounted in well 32 of the lower housing section, beneath loudspeaker 38, and indicated generally by a dashed block 44, are the electrical components of what is referred to herein as a ringup circuit. The features of this circuit also will be more fully described later on.

Figures 2, 4:
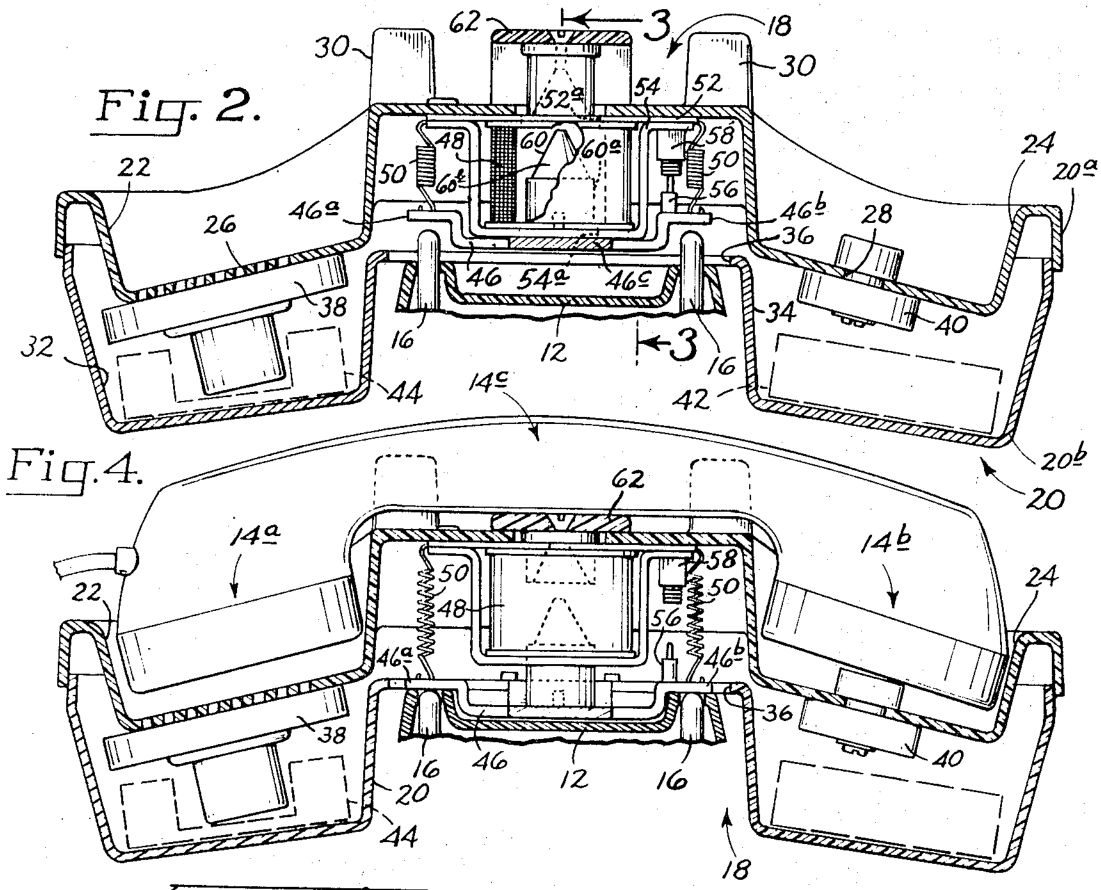
FIG. 2 is a cross-sectional view of the answering device of FIG. 1, taken generally along the line 2–2 in FIG. 1, the answering device being shown without any telephone handset resting thereon.
FIG. 4 is a view, somewhat similar to the view in FIG. 2, but showing parts in the answering device in one set of positions that they occupy with a telephone handset resting on and held in the device.
Figure 3:
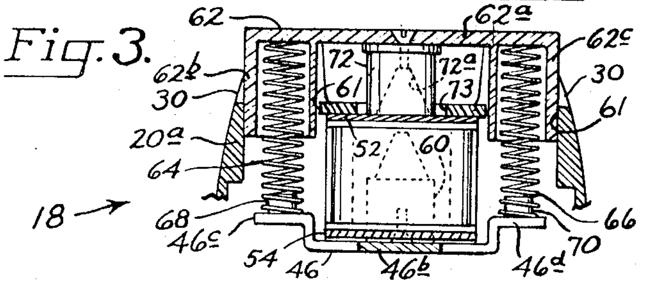
FIG. 3 is a cross-sectional view taken generally along the line 3–3 in FIG. 2.

With reference now to FIGS. 2 and 3, answering device 18 further includes mechanism for operating, or adjusting the position of cradleswitches 16 of the telephone. Such mechanism comprises a shiftable actuator bar 46. The actuator bar has one pair of opposed arms 46*a*46*b*(seen in FIG. 2) that project away from each other in a direction extending longitudinally of the housing, and another pair of opposed arms 46*c*46*d*(seen in FIG. 3) that project away from each other and to laterally opposite sides of the housing. Previously mentioned opening 36 has a shape fully exposing the bar and its arms on the underside of housing 20. Bar 46 normally is disposed adjacent the base of the answering device above opening 36, with arms 46*a*, 46*b* directly overlying cradleswitches 16.

Means for urging actuator bar 46 to the raised position shown for the bar in FIGS. 2, 3 and 5 comprises a hollow cylindrical solenoid 48, a soft iron core member 60, and a pair of springs 50. Springs 50 are also referred to herein as lifting means.

Solenoid 48 is disposed above the actuator bar, and is fastened in place between a pair of soft iron mounting members 52, 54. Member 54, as seen in FIG. 2, has a somewhat U-shaped configuration which cradles the solenoid. These mounting members are suitably fastened together, and are mounted on upper housing section 20*a*. Mounting members 52, 54 include openings 52*a*, 54*a*, respectively, which register with the upper and lower ends, respectively, of the hollow interior of the solenoid. Core member 60 has a substantially cylindrical lower portion 60*a*, and an integral, substantially conical upper portion 60*b*. The core member is fastened by a screw to the actuator bar, and in the raised position shown for the bar in FIG. 2, extends upwardly into the hollow interior of solenoid 48 through opening 54*a*. With solenoid 48 energized, core member 60 is drawn up into the interior of the solenoid, and thus the description of these elements as a power-operated means.

Springs 50 are connected between mounting member 54 and arms 46*a*, 46*b* in the actuator bar. These springs are under tension, and operate independently of solenoid 48 tending at all times to urge the actuator bar into its raised position.

Formed integrally on bar 46*b*, and projecting upwardly therefrom, is a finger 56. Disposed directly over this finger, and suitably fastened to mounting member 54 is a switch mechanism 58.

Still referring to FIGS. 2 and 3, the mechanism for adjusting the position of cradleswitches 16 further comprises a shiftable handset support 62 located approximately centrally between the wells in the housing. The handset support includes an elongated planar deck portion 62*a* which is disposed above the top of the housing, and which extends substantially completely across the width of the housing. With the answering device in operative position on the telephone base, as is illustrated in FIGS. 2 and 3, deck portion 62*a* occupies a substantially horizontal plane. Projecting downwardly from opposite ends of deck portion 62*a* are sleeve portions 62*b*, 62*c*. The sleeve portions extend through suitable openings 61 which are provided in the top of upper housing section 20*a*.

The handset support is supported on a pair of upright springs 64, 66 which extend between opposite sides of deck portion 62*a* in the handset bar and arms 46*c*, 46*d* in actuator bar 46. Springs 64, 66 have their upper ends seated in sleeve portions 62*b*, 62*c*, respectively, and have their lower ends fitted around upright cylindrical posts 68, 70 which are formed integrally on top of arms 46*c*, 46*d*, respectively, in the actuator bar. These springs are larger and stiffer, and exert a greater bias than biasing springs 50 previously described.

Suitably fastened to the deck portion of the handset bar, and projecting downwardly therefrom, is a soft iron solenoid core member 72. This core member around the outside is substantially cylindrical, and has approximately the same diameter as the cylindrical lower portion of core member 60. Member 70 has a conical recess 72*a* formed in its lower end, this recess being constructed to match with conical upper portion 60*b* in core member 60. The lower end of core member 72 extends down through an opening 73 in the top housing section, and on downward shifting of the handset bar relative to the housing moves into the hollow interior of solenoid 48.

Figure 6:
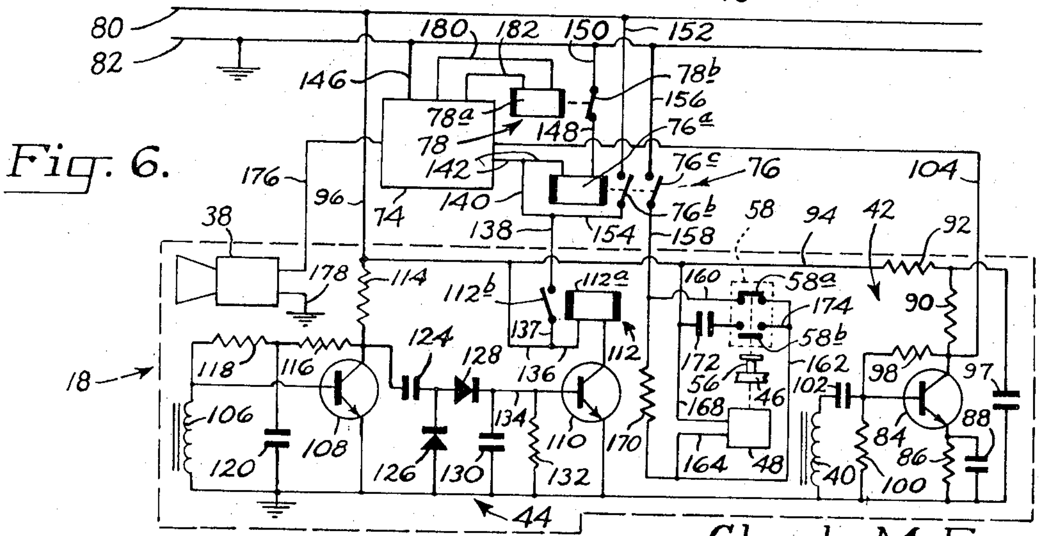
FIG. 6 is a schematic diagram illustrating a circuit employed in the answering device of FIGS. 1—5.

In FIGS. 1 through 5, most of the electrical components which the answering device contains have been omitted to obtain better clarity in the drawings. As will be appreciated by those killed in the art, the answering device, when properly operating is used with recording equipment which includes a recording device for recording any messages which may come in over the telephone. FIG. 6 illustrates the circuits which may be included with the answering device, including previously mentioned circuits 42, 44. All of the components bounded by dashed block 18 in FIG. 6 are contained within housing 20 of the answering device. Previously mentioned switch mechanism 58 can be seen in FIG. 6 to include a normally closed switch 58*a* and a normally open switch 58*b*.

Portions of conventional recording equipment are shown in FIG. 6 outside of dashed block 18. Shown in block form at 74 is a suitable recording device in the equipment. It should be understood that this device may take the form of any one of a number of available recording devices which are adapted to record and play out messages. At 76, 78 are a pair of control relays. Relay 76 includes a solenoid 76*a*, and a pair of normally open switches 76*b*, 76*c*. Relay 78 includes a solenoid 78*a* and a normally closed switch 78*b*. Power supply conductors, which are connected to a suitable source of DC power (not illustrated), are shown at 80, 82.

In the answering device illustrated, receiving circuit 42 comprises a single-stage transistor amplifier employing a transistor 84. The emitter of this transistor is connected to ground through a resistor 86 and a capacitor 88 which is connected in parallel with this resistor. The collector of the transistor is connected to conductor 80 through a pair of resistors 90, 92 and a pair of conductors 94, 96. A capacitor 97 connects the junction between resistors 90, 92 to ground. Bias voltage is supplied the base in transistor 84 through a pair of resistors 98, 100, with resistor 98 connected between the collector and base in the transistor, and resistor 100 connected between the base and ground.

Input signals are fed to the base of transistor 84 from previously mentioned coil 40 which has one end connected to ground and the other end connected to the base through a capacitor 102. Amplified output signals coming from the transistor are fed into recording device 74 through an output conductor 104 which is connected between the recording device and the collector in the transistor.

Considering now the construction of ringup circuit 44, it comprises a ringup coil 106, a pair of transistors 108, 110, and a relay 112 which includes a solenoid **112*a* and a normally open switch 112*b*. Transistor 108 has its emitter connected directly to ground, and its collector connected to conductor 80 through a resistor 114 and conductor 96. The base of the transistor is connected to ground through coil 106, and in addition is connected to the collector in the transistor through series connected resistors 116, 118. A capacitor 120 is interposed between the junction of resistors 116, 118** and ground.

Input signals are fed to the base of transistor 108 from ringup coil 106. Amplified output signals coming from the transistor are fed by an output capacitor 124 to a circuit including diodes 126, 128 and a capacitor 130.

Considering transistor 110, its emitter is connected directly to ground, and its base is connected to ground through a resistor 132. The base is also connected to the junction between diode 128 and capacitor 130 by a conductor 134, and through this conductor input signals are fed to the base. The collector of transistor 110 is connected to conductor 80 through a series circuit including solenoid **112*a* of relay 112, a conductor 136, and conductors 94, 96**.

Explaining now how the answering device operates, with the device seated in operative position on the base of the telephone, and the handset held in the device (as shown in FIG. 4), transducer **14*a* sits in well 22 and is positioned closely adjacent loudspeaker 38, and transducer 14*b* sits in well 24 and is positioned closely adjacent coil 40. Handle 14*c* in the handset rests on top of deck portion 62*a* in the handset support, and, due to the weight of the handset, causes the support to be shifted to the lowered position indicated in FIG. 4. It should be noted with reference particularly to FIG. 4, that the full weight of the handset acts through handset support 62, springs 64, 66, and actuator bar 46 to urge cradleswitches 16 downwardly to their retracted positions. This results from the fact that the handset is fully supported by deck 62*a* in support 62. In other words, deck 62*a*** ensures full utilization of the weight of the handset to depress the cradleswitches—a feature which is important in enabling the device to be used successfully with many different telephones, where the weights of the handsets, and the biasing forces acting to raise the cradleswitches, may vary.

Since springs 64, 66 (shown in FIG. 3) are stiffer than springs 50, such shifting of the handset support causes actuator bar 46 to be shifted down to the position shown in FIG. 4, with some expansion resulting in spring 50 and a small amount of compression resulting in springs 64, 66. With the actuator bar shifted down, it extends down into and partially through opening 36 in housing **20*b*, and its arms 46*a*, 46*b* cause cradleswitches 16 to be depressed into telephone base 12**, just as if the handset were seated on the base in its normal position with the answering device completely removed.

With the answering device in the position just described, and connected to the recording device and control relays as shown in FIG. 6, the switches in relays 76, 78, 112, and those in switch mechanism 58, initially occupy the positions in which they are illustrated.

When a call is received at the telephone, the ringing mechanism therein is energized in a well-known manner by an AC current, and produces the usual ring to indicate the incoming call. In a conventional telephone, such mechanism is located adjacent the left hand side of the telephone base (as the base is viewed in FIG. 1) which is adjacent circuit 44 including ringup coil 106 with the answering device seated on the base. The current which energizes the ringing mechanism, by its proximity to the ringup coil, induces a current in the ringup coil, and this induced current results in an input signal which is fed to the base of transistor 108 in circuit 44. It is important to note that no conductive connection is required to produce this current. Such an input signal is amplified in transistor 108 and results in a DC voltage being produced across capacitor 130. This DC voltage causes transistor 110 to conduct, whereupon current flows through and energizes solenoid **112*a***.

With energizing of solenoid **112*a*, switch 112*b* closes and completes circuits next to be described, which supply power from conductors 80, 82 to recording device 74 and to control relay 76. The circuit supplying power to the recording device may be traced from supply conductor 80 through previously mentioned conductors 96, 94, 136, a conductor 137, switch 112*b*, conductors 138, 140, 142, recording device 74, and a conductor 146 which is connected between the recording device and supply conductor 82. The circuit supplying power to relay 76 includes a portion of this circuit just previously described, beginning with supply conductor 80 and continuing through conductor 142, and further includes relay solenoid 76*a*, a conductor 148, switch 78*b*, and a conductor 150 which is connected between switch 78*b* and supply conductor 82**.

On energizing of relay 76, switches **76*b*, 76*c* close. With closing of switch 76*b*, a holding circuit is completed for maintaining relay 76 and recording device 74 connected to supply conductor 80 independently of switch 112*b*. This holding circuit comprises, progressing from conductor 80, a conductor 152, switch 76*b*, a conductor 154, and previously mentioned conductors 140, 142. As will become apparent, this holding circuit is important since switch 112*b* will reopen shortly after ringing ceases. With closing of switch 76*c*, power is supplied to solenoid 48 in the answering device through a circuit which includes, progressing from supply conductor 82, a conductor 156, switch 76*c*, a pair of conductors 156, 158, switch 58*a*, a pair of conductors 162, 164, solenoid 48, a conductor 168, conductor 94, and conductor 96 which is connected to supply conductor 80**.

With power supplied to solenoid 48, this solenoid is energized. Referring for a moment to FIG. 5, on energizing the solenoid 48, a magnetic field is created in the hollow interior of the solenoid, and this exerts a force which tends to draw solenoid core members 60, 72 toward each other. Core member 72 remains fixed in position, partly because it is fastened to handset support 62 which is held down against the top of the upper housing section by the weight of handset 14, and partly because it is within the hollow interior of solenoid 48 where it is acted upon and held against upward movement by the magnetic field created therein. Core member 60, on the other hand, shifts upwardly against the downward forces produced by springs 64, 66 to the position shown in FIG. 5, with the upper conical portion of core member 60 fitting into the conical recess in core member 72. This lifts actuator bar 46.

On lifting of the actuator bar, cradleswitches 16 in the telephone are freed to shift to their elevated positions where they project upwardly from the top of the telephone base. This results in the telephone being placed in an answered condition just as if the handset had been lifted from the base in the usual manner in answering an incoming call. The handset, however, remains in the same position which it had in the answering device prior to the call coming in. Also, with lifting of the actuator bar to the position shown in FIG. 5, finger 56 engages and actuates switch mechanism 58, thus to open switch 58*a* and close switch 58*b*.

Referring again to FIG. 6, with opening of switch 58*a*, power is now supplied solenoid 48 through a resistor 170 which is connected between conductors 160, 164. It has been found that in order for solenoid 48 properly to lift the actuator bar, it is necessary for the solenoid initially to be supplied with a greater amount of current than that which is required to hold the bar in an elevated position once it has been lifted. For this reason, resistor 170 is initially short-circuited by conductors 160, 162 and switch 158. However, this short circuit later is removed to reduce the amount of current flowing to the solenoid. With closing of switch 58*b*, a capacitor 172 is connected across the solenoid through a circuit including conductor 168, capacitor 172, switch 58*b*, a conductor 174, and conductors 162, 164. Capacitor 172 is connected across the coil for the purpose of filtering out any undesired AC ripple current which might be included in the DC current fed to the solenoid.

Recording device 74 which, it will be recalled, was initially supplied with power on closing of switch 76*b*, operates first to play out a message, if such has been prerecorded in the device, to loudspeaker 38 which is connected between the device and ground by a pair of conductors 176, 178. With loudspeaker 38 positioned adjacent the base of well 22, the speaker communicates this message through slot opening 26 to the transmitting transducer in the handset which extends downwardly into the well. The played out message is then communicated over the telephone lines in the usual manner to the calling party. In a typical message of the type just outlined, the calling party is invited to record any message which he may wish to leave for the owner of the telephone, and thus, when the played out message is complete, the recording device is placed in a condition where it is ready to receive an incoming message.

Assuming that the calling party desires to record such a message, his message is received in the form of electrical signals in the receiving transducer of the telephone handset. With this receiving transducer extending down into well 24 in the answering device, and with coil 40 extending up into the well, such signals which are received in the receiving transducer induce currents in the coil, which currents result in an input signal being fed into transistor 84. Such a signal fed into the transistor is amplified and supplied through conductor 104 to the recording device wherein it is recorded.

When the message coming in from the calling party is completed, the recording device, in a manner known to those skilled in the art, causes relay solenoid 78*a*, which is connected to the recording device by a pair of conductors 180, 182, to be momentarily energized. With energizing of solenoid 78*a*, switch 78*b* momentarily opens, and this results in deenergizing of relay solenoid 76*a* and opening of switches 76*b*, 76*c*. On opening of switch 76*b*, the holding circuit previously described is broken, whereupon the recording device is turned off. On opening of switch 76*c*, solenoid 48 is deenergized, whereupon actuator bar 46 is returned by springs 64, 66 to the lowered position illustrated in FIG. 4 where its arms 46*a*, 46*b* again depress cradleswitches 16 into the telephone base.

Thus, the recording device, the telephone answering device, and the telephone with which the answering device is being used, are all returned to the conditions which they had just prior to a call being received at the telephone, except that recording device 74 is now storing the incoming message which was recorded during the call.

With the answering device in operative position, if it is desired to use the telephone in the normal manner to place a call, the handset is lifted from the device. With reference to FIG. 2, once the handset is lifted off support 62, lifting springs 50, lift actuator bar 46, together with springs 64, 66 and support 62, to the elevated positions shown, and this allows the cradleswitches to project up from the top of the telephone base, thus to place the telephone in a condition to make a call.

With springs 50 acting in this fashion, the biasing springs or other means in the telephone base which urge the cradleswitches to their raised positions are not relied upon to lift the actuator bar and the structure that it supports. Accordingly, the device offers good reliability in ensuring clearance for the cradleswitches to raise when the handset is lifted for use. A call is then made in the usual fashion by operating the dial mechanism in the telephone. On completion of the call, the handset is replaced in the answering device, and the various parts in the device, and cradleswitches 16 in the telephone, return to the positions shown in FIG. 4.

Thus, the invention provides an answering device which is relatively small and convenient to use. It requires no conductive connection to a telephone and as should be apparent, when connected for use, it in no way interferes with the normal use of the telephone. With the handset of a telephone received in the device, transmitting and receiving transducers in the handset are positioned closely adjacent communications means included in the device thereby to facilitate communication between the device and the telephone. No modification of a telephone is necessary in order for the device to work properly, and thus the device may readily be shifted from one telephone to another when desired.

While a preferred embodiment of the invention has been shown, it is appreciated that variations and modifications are possible and may become apparent to those skilled in the art.

We claim:

1. In an answering device for a telephone having a handset, a base for holding the handset, and cradleswitch means adjacent the top of the base biased to one position where it projects upwardly from the base, and having another position where it is retracted into the base, said answering device including a housing adapted to be seated on and supported by said base:

cradling means formed in said housing for receiving the handset with the housing seated in operative position on said base; and adjusting means mounted on said housing for adjusting the position of said cradleswitch means with the handset placed in and removed from said cradling means comprising:

a movable actuator bar disposed over and operable to engage said cradleswitch means with the housing seated on said base, a movable handset support including a substantially planar deck portion extending substantially completely across the width of the housing adjacent said cradling means, said deck portion being positioned to be engaged by the handset with such received in the cradling means, and being constructed to provide the sole vertical support for a handset so received;

means operatively interposed between said handset support and actuator bar operable to shift said actuator bar downwardly against said cradleswitch means to place the same in its said other position with the handset received in said cradling means and supported by said support, and with the housing seated on said base; and continually acting lifting means operatively interposed between said actuator bar and said housing and exerting an upward pull on said actuator bar operable, on the handset being removed from said cradling means and with the housing seated on said base, to lift the actuator bar away from the cradleswitch means thereby releasing the same and providing clearance thereabove enabling the cradleswitch means freely to move and to assume its said one position.

2. The answering device of claim 1, wherein said adjusting means further comprises power operated means operatively connected to said actuator bar operable, on being energized and with the handset received in the cradling means and the housing seated on said base, to lift said bar away from said cradleswitch means thereby to permit the cradleswitch means to assume its said one position without removal of the handset from the cradling means.

3. The answering device of claim 1, wherein the means operatively interposed between said handset support and said actuator bar comprises a pair of springs under compression supported on said bar and supporting opposite sides of said deck portion.

4. The answering device of claim 3 wherein said lifting means comprises a pair of springs under tension disposed above said actuator bar.

5. The answering device of claim 4, wherein the springs in said first-mentioned pair of springs are stiffer than the springs in said second-mentioned pair of springs.

6. The answering device of claim 2, wherein said power operated means comprises a solenoid disposed over said actuator bar, and a movable member anchored to said bar which is acted upon and drawn upwardly by the magnetic field produced by said solenoid upon energizing thereof.

7. The answering device of claim 6, wherein said solenoid is disposed below said deck portion in said handset support, and which further comprises a member anchored to said deck portion which member is positioned to be acted upon and urged downwardly by said magnetic field.

8. For a telephone having a handset including transmitting and receiving transducers, a base for holding the handset, and cradleswitch means adjacent the top of the base biased to one position where it projects upwardly from the base and having another position where it is retracted into the base, an answering device including a housing adapted to be seated on and supported by said base with the handset removed, said device comprising:

cradling means formed in said housing for receiving the handset with the housing seated in operative position on said base;

communication means mounted on said housing directly adjacent at least one of said transducers for communicating with the transducer when the handset is received in said cradling means; and and adjusting means mounted on said housing for adjusting the position of said cradleswitch means with the handset placed in and removed from said cradling means comprising:

a movable actuator bar disposed over and operable to engage said cradleswitch means with the housing seated on said base;

a movable handset support including a substantially planar deck portion extending substantially completely across the width of the device adjacent said cradling means, said deck portion being positioned to be engaged by the handset with such received in said cradling means, and being constructed to provide the sole vertical support for a handset so received;

means operatively interposed between said handset support and actuator bar operable to shift said actuator bar downwardly against said cradleswitch means to place the same in its said other position with the handset received in said cradling means and supported by said handset support, and with the housing seated on said base;

continually acting lifting means operatively interposed between said actuator bar and said housing and exerting an upward pull on said actuator bar operable, on the handset being removed from said cradling means and with the housing seated on said base, to lift the actuator bar away from the cradleswitch means thereby releasing the same and providing clearance thereabove enabling the cradleswitch means freely to move and to assume its said one position; and power operated means operatively connected to said actuator bar operable, on being energized and with the handset received in the cradling means and said housing seated on said base, to lift said bar away from said cradleswitch means thereby to permit the cradleswitch means to assume its said one position without removal of the handset from the cradling means.